United States Patent
Takahara

(10) Patent No.: US 7,278,659 B2
(45) Date of Patent: Oct. 9, 2007

(54) WINDOW AIR BAG DEVICE AND ADAPTATION METHOD THEREOF TO VEHICLES

(75) Inventor: Isamu Takahara, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 221 days.

(21) Appl. No.: 10/450,395

(22) PCT Filed: Dec. 27, 2001

(86) PCT No.: PCT/IB01/02678

§ 371 (c)(1),
(2), (4) Date: Jun. 13, 2003

(87) PCT Pub. No.: WO02/051670

PCT Pub. Date: Jul. 4, 2002

(65) Prior Publication Data

US 2004/0026906 A1  Feb. 12, 2004

(30) Foreign Application Priority Data

Dec. 27, 2000  (JP)  ............... 2000-398691

(51) Int. Cl.
*B60R 21/16* (2006.01)

(52) U.S. Cl. .............. 280/743.2; 280/730.2; 280/728.1; 280/743.1

(58) Field of Classification Search ......... 280/730.2, 280/743.2, 728.1, 729, 743.1
See application file for complete search history.

(56) References Cited

U.S. PATENT DOCUMENTS

| 5,090,729 A * | 2/1992 | Watanabe ............ 280/743.1 |
| 5,788,270 A | 8/1998 | Håland et al. |
| 6,010,149 A | 1/2000 | Reidel et al. |
| 6,176,514 B1 | 1/2001 | Einsiedel |
| 6,273,457 B1 | 8/2001 | Fischer |

FOREIGN PATENT DOCUMENTS

| DE | 299 07 622 U1 | 10/1999 |
| DE | 199 39 618 A 1 | 5/2000 |

(Continued)

*Primary Examiner*—Ruth Ilan
(74) *Attorney, Agent, or Firm*—Oliff & Berridge, PLC

(57) ABSTRACT

According to a small number of types classified among all passenger vehicle models on the basis of a distance between front and rear seats (Sf, Sr), supply parts for an airbag module (10, 110) including an airbag (11, 111), a tension cloth (12) and an inflator (14) include a small number of types of the airbags (11, 111) including an expansion portion for front seat (11c, 111c) which covers protection ranges for the front seats (Sf) of a plurality of vehicle models included in the respective types and an expansion portion for rear seat (11d, 111d) which covers protection ranges for the rear seats (Sr) of a plurality of vehicle models included in the respective types, a small number of types of tension clothes (12) a shape of which is determined to cover a plurality of vehicle models to be equipped with the respective airbags (11, 111), and a single type of inflator (14) connected with a gas inlet (11a, 111a) provided in the respective airbags (11, 111). Consequently, the airbag module (10, 110) can be applied to all passenger vehicle models within a fleet of vehicles and the cost can be lowered thereby.

4 Claims, 6 Drawing Sheets

FOREIGN PATENT DOCUMENTS

| | | |
|---|---|---|
| EP | 0 960 788 A1 | 12/1999 |
| GB | 2 242 167 A | 9/1991 |
| GB | 2 333 074 A | 7/1999 |
| JP | A 10-166988 | 6/1998 |
| JP | A 11-192916 | 7/1999 |
| JP | A 2000-5953 | 1/2000 |
| JP | A 2000-296752 | 10/2000 |
| JP | A 2000-296754 | 10/2000 |
| WO | WO 00/76813 A1 | 12/2000 |

* cited by examiner (a)

(b)

(c)

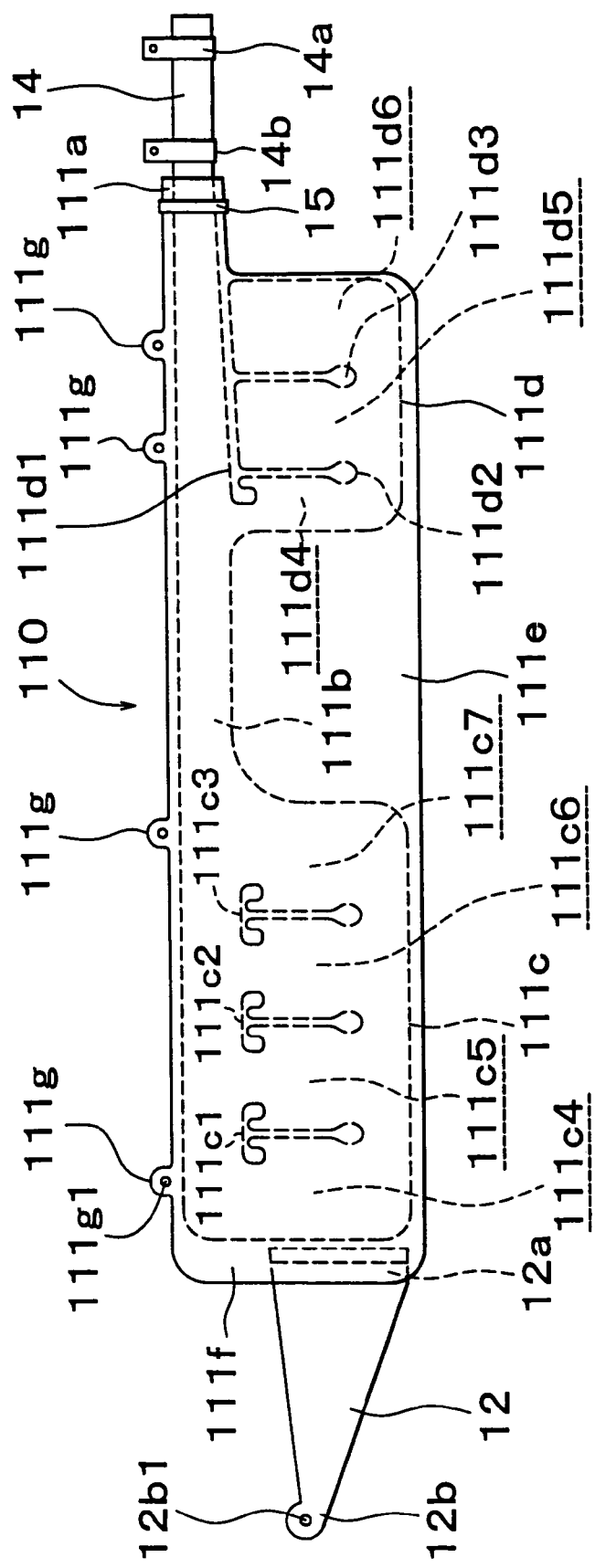

WINDOW AIR BAG DEVICE AND ADAPTATION METHOD THEREOF TO VEHICLES

This application is a 35 u.s.c. 371 national stage of PCT ID01/02678, filed Dec. 27, 2001, which claims priority to Japanese application JP 2000-39861, filed Dec. 27, 2000.

BACKGROUND OF THE INVENTION

1. Field of the Invention

The invention relates to a window airbag device and an adaptation method of the device for vehicles.

2. Description of Related Art

Among window airbag devices of this kind, there is an airbag apparatus characterized in that an airbag housed along a roof side rail, being supplied with gas from an inflator, expands and develops along a sidewall of a vehicle interior in the form of a curtain, such as the window airbag device disclosed in JP No. 3052085. The airbag disclosed therein includes an expansion portion for front seat with a gas inlet provided in a rear portion thereof, an expansion portion for rear seat with a gas inlet provided in a front portion thereof, an intermediate non-expansion portion provided between those expansion portions joining them in one body, and a front end non-expansion portion provided in front of the expansion portion for front seat.

In accordance with the airbag apparatus of the above-mentioned related art, the front end non-expansion portion of the airbag is provided integrally with the expansion portion for front seat, the intermediate non-expansion portion and the expansion portion for rear seat, and an attachment hole to be fitted to an A pillar (front pillar) is formed at a tip portion of the front end non-expansion portion, and the airbag is so formed as to conform to the shape of the vehicle body, where a shape of the expansion portion for front seat is determined according to the relative position thereof to a B pillar (center pillar), and a shape of the expansion portion for rear seat is determined according to the relative position thereof to a C pillar (rear pillar). Accordingly, there existed a problem that, when applying the window airbag device, for example, to all passenger vehicle models, the airbag has to be made for each passenger vehicle model, therefore in as many types as the total number of the passenger vehicle models. As it is required to produce a plurality of different components which form the airbag devices for different vehicle models, the production costs are high.

SUMMARY OF THE INVENTION

It is one object of the invention to decrease the production costs, when producing airbag components for airbag devices provided for a plurality of different vehicle models within a fleet of vehicles.

The invention provides a window air bag device for a vehicle to protect the head of passengers sitting on a front seat and a rear seat of the vehicle in the event of a side collision, the air bag device comprising an inflatable air bag having a front expansion portion for protecting the head of a front seat passenger, a rear expansion portion for protecting the head of a rear seat passenger, and a gas passage connecting a gas chamber of the front expansion portion with a gas chamber of the rear expansion portion; a tension cloth to apply a tension to the inflated air bag; and an inflator connected with a gas inlet of the air bag to inflate it; wherein the air bag device for a selected vehicle within a fleet of vehicles may be constructed by an air bag selected from a small number of air bags having different dimensions, a tension cloth selected from a small number of tension clothes having different dimensions and a single inflator.

In addition, the invention provides an adaptation method for adapting a window air bag device to a plurality of vehicle models, comprising the steps of determining a shape and number of types of the airbags comprising a front expansion portion for protecting the head of a front seat passenger, a rear expansion portion for protecting the head of a rear seat passenger, and a gas passage connecting a gas chamber of the front expansion portion with a gas chamber of the rear expansion portion; determining a shape and number of types of tension clothes on the basis of a longitudinal length between the respective airbags and A pillars of the respective vehicle models to be provided with the airbags; and adapting an airbag module constructed by combining one airbag conformable to the vehicle model, selected from a small number of types of airbags, one tension cloth conformable to the vehicle model, selected from a small number of types of tension clothes, and a single type of inflator connected with a gas inlet provided in the respective airbags, to the vehicle model.

In accordance with the window airbag device and the adaptation method thereof to the vehicle models to be equipped with the airbag apparatus of the invention, supply parts for the airbag module to be applied to all passenger vehicle models (generally, a car manufacturer who produces passenger vehicles of various kinds has 20 through 30 vehicle models) consist of a small number of types of airbags (e.g. 5-6 types or less, preferably 3 types), a small number of types of tension clothes (e.g., 5-6 types or less, preferably 3 types), and a single type of inflator, whereby the number of parts to be made (number of supply parts) for the airbag module to be applied to all passenger vehicle models can be reduced and the cost can be lowered.

BRIEF DESCRIPTION OF THE DRAWINGS

The above and other objects, features, advantages, and technical and industrial significance of this invention will be better understood by reading the following detailed description of exemplary embodiments of the invention, when considered in connection with the accompanying drawings, in which:

FIG. 6 is a side view of a second embodiment of the window airbag device of the invention and corresponds to FIG. 2 for the first embodiment.

DETAILED DESCRIPTION OF PREFERRED EMBODIMENTS

Figure 1:
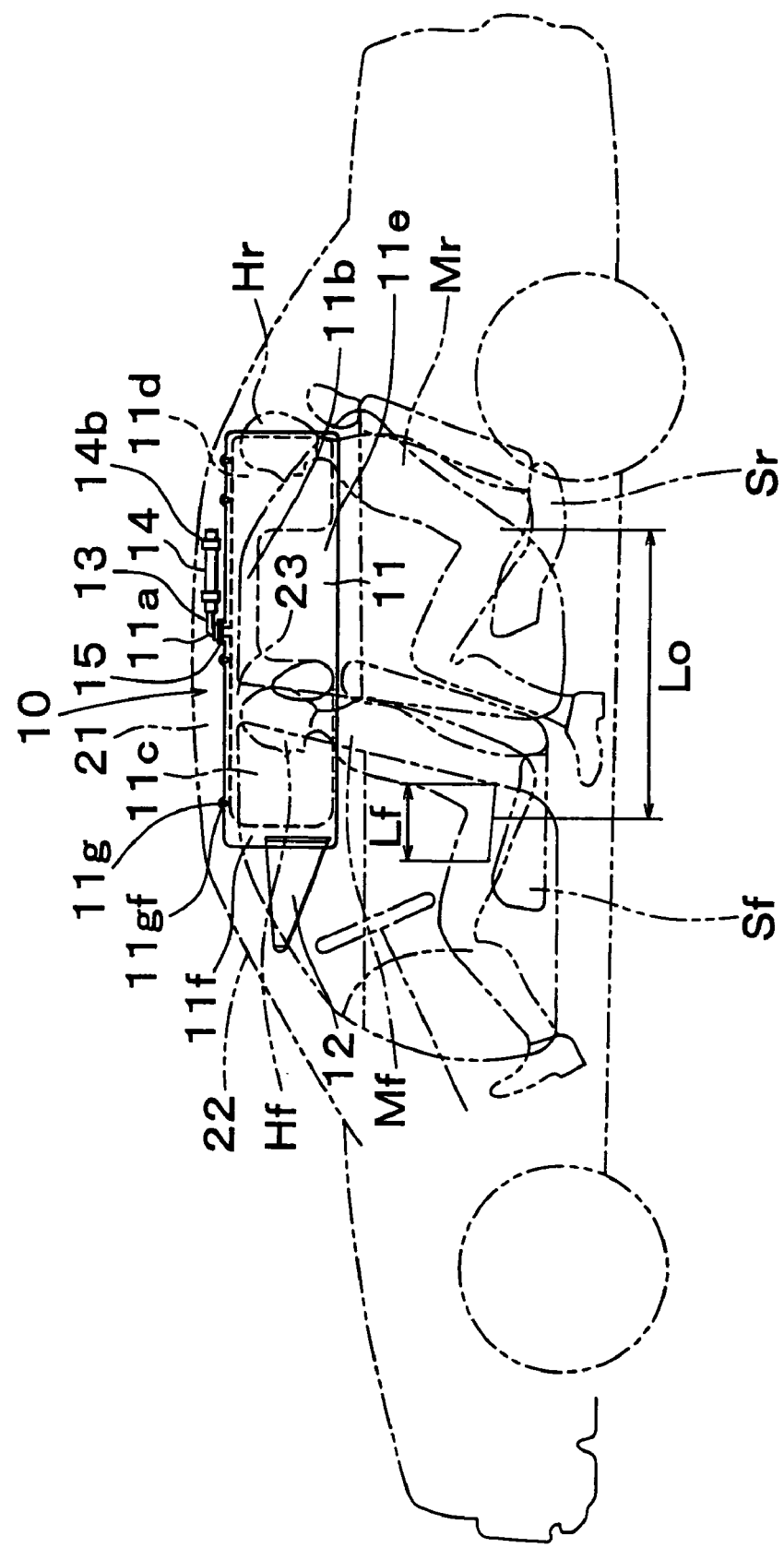
FIG. 1 is a side view of a first embodiment of the window airbag device of the invention.

In the following description and the accompanying drawings, the invention will be described in more detail in terms of preferred embodiments.

Hereinafter, a first embodiment of the invention will be described with reference to figures. A window airbag device in the first embodiment shown in FIGS. 1 through 5 is provided with an airbag module 10 including an airbag 11 which expands and develops along a sidewall of a vehicle interior, a tension cloth 12 attached at a front end portion of the airbag 11, and an inflator 14 connected with a gas inlet 11a of the airbag 11 via a diffuser pipe 13 (FIG. 2).

The airbag 11 is formed hollow with weave patterns extending in the vertical and longitudinal directions, being applied with coating for hermetic sealing on a surface thereof, and including the gas inlet 11a, a gas passage 11b which extends in the longitudinal direction and crosses a lower end of the gas inlet 11a substantially at right angles, an expansion portion for front seat 11c and an expansion portion for rear seat 11d communicating with one another via the gas passage 11b, an intermediate non-expansion portion 11e, a front end non-expansion portion 11f, and four attachment tabs 11g. The attachment tabs 11g are respectively provided with attachment holes 11g1 to be fitted to the roof side rail.

Figure 2:
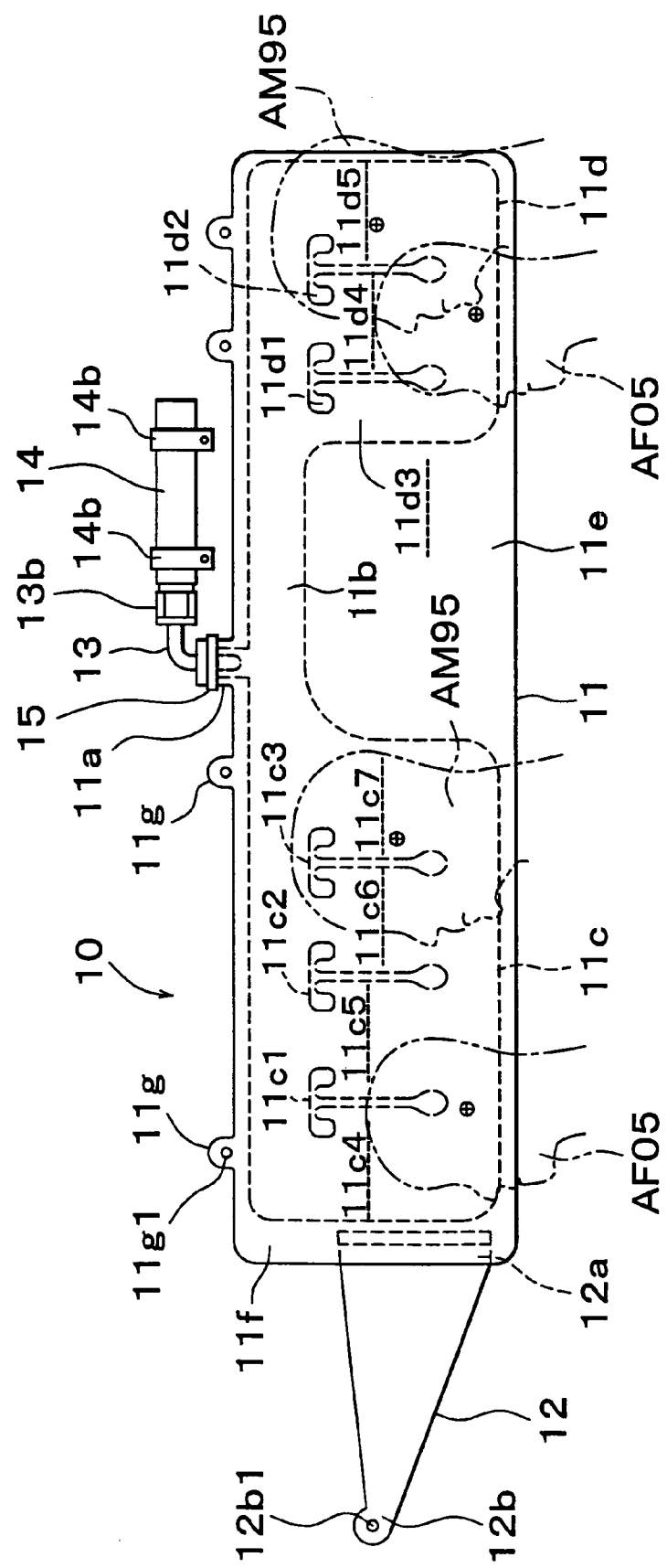
FIG. 2 is an enlarged side view of an airbag module illustrated in FIG. 1.

The expansion portion for front seat 11c, as illustrated in FIG. 1 and FIG. 2, is to protect a head Hf of an occupant Mf seated on a front seat Sf (a seat located with respect to a B pillar 23), including three T-shaped partition portions (non-expansion portions), 11c1, 11c2, and 11c3 at the vertical center thereof, which compart the central interior portion thereof into four expansion chambers (cells), 11c4, 11c5, 11c6, and 11c7 which communicate with one another at upper and lower ends.

The expansion portion for rear seat 11d, as illustrated in FIG. 1 and FIG. 2, is to protect the head Hr of the occupant Mr seated on a rear seat Sr, including two T-shaped partition portions, 11d1 and 11d2, which compart the central interior portion thereof into three expansion chambers (cells), 11d3, 11d4, and 11d5 which communicate with one another at upper and lower ends.

The tension cloth 12, made of an uncoated textile fabric, which is thinner and less costly than the fabric used for the airbag 11, and formed in a triangular shape (the shape can be changed accordingly and also a zonal shape is applicable), is stitched to the front end non-expansion portion 11f of the airbag 11 by a rear end portion 12a and attached to an A pillar 22 by an attachment hole 12b1 (FIG. 1) provided in a front end portion 12b.

Figure 5:
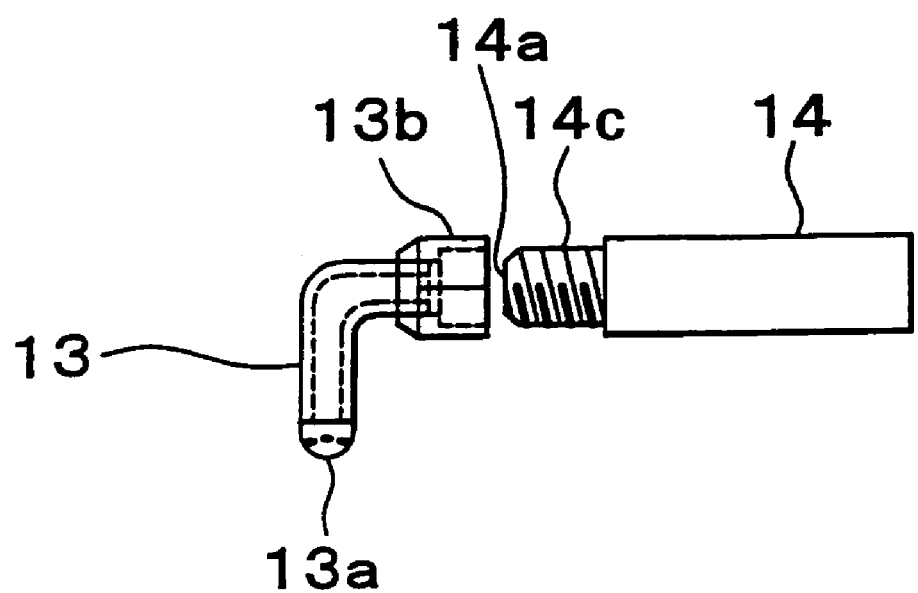
FIG. 5 shows side views of a diffuser pipe and inflator illustrated in FIG. 2.

The diffuser pipe 13, as illustrated in FIG. 2 and FIG. 5, is so formed as to be thin and generally in the shape of the letter J, being fixedly connected to an externally threaded portion 14c provided at a gas injection hole 11a of the inflator 14 airtightly and integrally by means of a flare nut 13b and, at the other side, connected with the gas inlet 11a of the airbag 11 airtightly by means of a tightening band 15, and has a smaller diameter than the gas inlet such that a specified clearance is provided between the gas inlet 11a and the diffuser pipe 13. This clearance is for allowing the gas, when being injected, to be radiated at the end of the diffuser pipe 13

A showerhead 13a (FIG. 5) for dispersing (diffusing) a flow of the gas (gas flow) supplied from the inflator 14 in all directions (radial directions) is integrally provided at the end of the diffuser pipe 13 (a gas injection hole of the diffuser pipe 13), in other words, the part which faces towards the gas passage 11b of the airbag 11. And the length of the end portion of the diffuser pipe 13 is determined such that the showerhead 13a does not protrude into the gas passage 11b of the airbag 11.

The inflator 14, which injects the gas towards the airbag 11 in the event of side collision, rollover, and the like of the vehicle, is attached to a roof side rail 21 by a bracket 14b by means of bolts, rubber bushings, etc. (not shown). The inflator 14 is covered by a roof head lining (not shown).

In accordance with the window airbag device of the first embodiment constructed as mentioned above, the airbag 11 and the tension cloth 12, in normal state, being folded in a vertical direction and enclosed in a breakable bag (not shown), is housed along the A pillar 22 and the roof side rail 21, and is covered by an A pillar garnish and a roof head lining (both not shown).

In the event of side collision, rollover, and the like, of the vehicle, the gas injected from the inflator 14 runs into the gas inlet 11a of the airbag 11 through the diffuser pipe 13 and the showerhead 13a, developing the airbag 11 downward deforming the corresponding portion of the roof head lining towards the vehicle interior and, at the same time, the tension cloth 12 downward deforming the corresponding portion of the A pillar garnish towards the vehicle interior. Then, the airbag 11, as illustrated in FIG. 1, expands and develops along the sidewall of the vehicle interior in the form of a curtain. At this time, the respective expansion portions 11c and 11d of the airbag 11 expand and develop towards the head-protection areas located beside the heads Hf and Hr of the occupants Mf and Mr.

Figure 3:
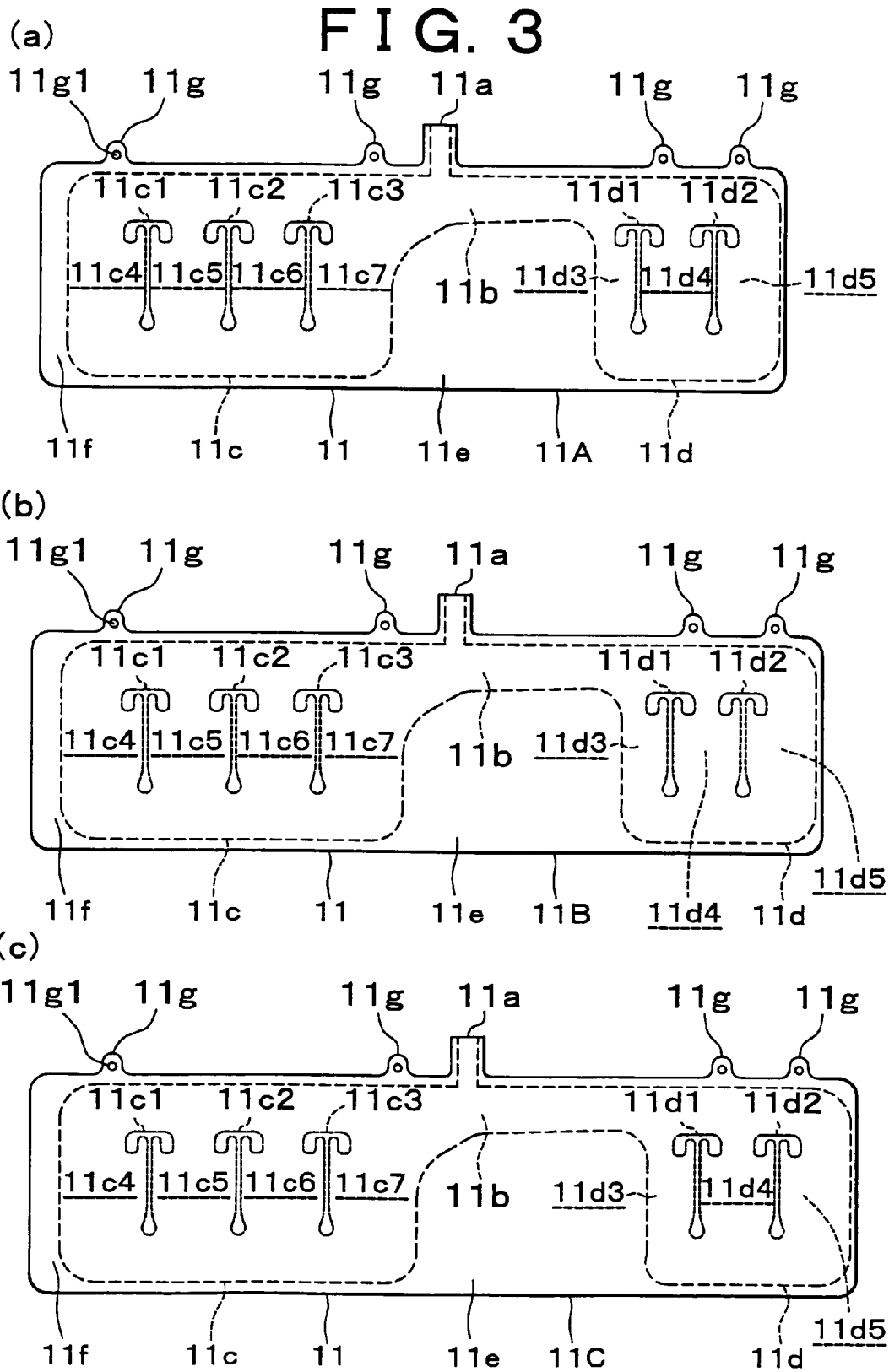
FIG. 3 includes side views (a), (b), and (c) of three types of airbags including the airbag illustrated in FIG. 2.
Figure 4:
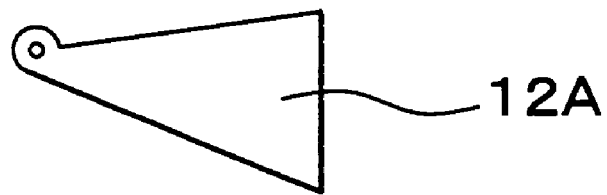
FIG. 4 includes side views (a), (b), and (c) of three types of tension clothes including the tension cloth illustrated in FIG. 2.
Figure 4:
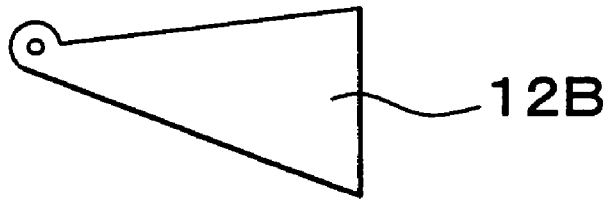
Figure 4:
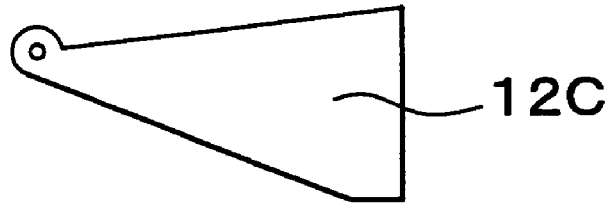

In this embodiment, the airbag conformable to the vehicle model is selected as the airbag 11 for the airbag module 10 from three types of airbags 11A, 11B, and 11C illustrated in FIGS. 3, (a), (b), and (c), and the tension cloth conformable to the vehicle model is selected as the tension cloth 12 from three types of tension clothes, 12A, 12B, and 12C illustrated in FIGS. 4, (a), (b), and (c). And the thus selected airbag 11 and tension cloth 12 are combined with a single type of diffuser pipe 13 and a single type of inflator 14, illustrated in FIG. 5, to construct the airbag module 10.

Three types of airbags, 11A, 11B, and 11C illustrated in FIGS. 3(a), (b), and (c), according to three types of passenger vehicles classified among all passenger vehicle models on the basis of a distance between front and rear seats (Precisely a distance Lo which is a distance between the seating positions of the occupants Mf and Mr seated on a front seat Sf and a rear seat Sr respectively, both set at the reference longitudinal slide positions, and is sometime called "couple distance"), include the expansion portion for front seat 11c (can be either the same or different among the respective airbags, 11A, 11B, and 11C), which covers the protection ranges for front seats of a plurality of vehicle models included in the respective types (three types), and the expansion portion for rear seat 11d (can be either the same or different among the respective airbags, 11A, 11B, and 11C), which covers the protection ranges for rear seats of a plurality of vehicle models included in the respective types (three types). Lf shown in FIG. 1 is a longitudinal slide amount of the front seat Sf.

The protection range mentioned above, as illustrated in FIG. 2, covers at least the head-protection areas for occupants seated on the respective seats, which include American females of small stature (AF05, "AF" abbreviates "American Female" and AF05 represents American females of small stature falling within 5th percentile of a stature distribution in ascending order) up to American males of large stature (AM95, "AM" abbreviates "American Male" and AM95 represents American males of large stature falling within 95th percentile of a stature distribution in ascending order, that are, in other words, people falling within 5th percentile in the descending order of the distribution). For the front seat Sf, a normal frontmost seating position of a person of small stature (AF05) and a normal rearmost seating position of a person of large stature (AM95) are shown respectively. Shapes and dimensions of the three types of tension clothes 12A, 12B, and 12C, illustrated in FIGS. 4, (a), (b), and (c) are determined on the basis of a longitudinal length between the respective airbags 11A, 11B, and 11C and the A pillar 22 of the respective vehicle models to be provided with the airbag.

Accordingly, component parts for the airbag module 10 to be applied to all passenger vehicle models (Generally, a car manufacturer who produces passenger vehicles in various kind has 20 through 30 vehicle models.) need only include three types of airbags 11A, 11B, and 11C, three types of tension clothes 12A, 12B, and 12C, a single type of diffuser pipe 13, and a single type of inflator 14, whereby the number of parts to be made for the airbag module 10 to be applied to all passenger vehicle models (number of supply parts) can be reduced and the cost can be lowered.

In accordance with the airbag apparatus of the first embodiment, providing the gas inlet 11a between the expansion portion for front seat 11c and the expansion portion for rear seat 11d allows the gas to be supplied to the expansion portion for front seat 11c and the expansion portion for rear seat 11d substantially simultaneously, making the expansion portion for front seat 11c and the expansion portion for rear seat 11d expand and develop substantially simultaneously in a short time.

In accordance with the airbag apparatus of this embodiment, since the respective airbags 11A, 11B, and 11C have equal dimensions in the vertical direction, all airbag materials can be uniformed in vertical dimensions and the cost for a unit of airbag can be lowered thereby.

Although, in the first embodiment mentioned above, the supply parts for the airbag module 10 included three types of airbags 11A, 11B, and 11C, three types of tension clothes 12A, 12B, and 12C, a single type of diffuser pipe 13, and a single type of inflator 14, the number of types of the airbags and the tension clothes can be changed accordingly within a small number not exceeding 5 to 6 where an effect equivalent to that of the above-mentioned embodiment can expectedly be achieved. Further, the first embodiment may be implemented without the diffuser pipe 13 (a diffuser pipe independent of the inflator 14).

Next, a second embodiment of the window airbag device will be described.

Contrary to the first embodiment wherein the gas inlet 11a of the airbag 11 is provided between the expansion portion for front seat 11c and the expansion portion for rear seat 11d, in the second embodiment, a gas inlet 111a of an airbag 111, as illustrated in FIG. 6, are provided at a rear end of an upper side of an expansion portion for rear seat 111d. The second embodiment illustrated in FIG. 6 substantially has a same construction as the first embodiment (construction including the tension cloth 12 and the inflator 14) except the shape of the airbag 111 is different and the diffuser pipe (13) is not used, therefore explanation will be omitted the portions designated by the same reference number. A straight diffuser pipe may be used for implementing the second embodiment illustrated in FIG. 6.

The airbag 111 illustrated in FIG. 6 is formed hollow with weave patterns extending in the vertical and longitudinal directions, applied with coating for hermetic sealing on a surface thereof, and includes the gas inlet 111a, a gas passage 111b which extends in the forward direction from a front thereof, an expansion portion for front seat 111c and the expansion portion for rear seat 111d communicating with one another via the gas passage 111b, an intermediate non-expansion portion 111e, a front end non-expansion portion 111f, and four attachment tabs 111g. The respective attachment tabs are provided with attachment holes 111g1 to be fitted to the roof side rail.

The expansion portion for front seat 111c is to protect the head Hf of the occupant Mf seated on the front seat Sf, including three T-shaped partition portions (non-expansion portions), 111c1, 111c2, and 111c3 in the center thereof, which compart the central interior portion thereof into four expansion chambers (cells), 111c4, 111c5, 111c6, and 111c7 which communicate with one another at upper and lower ends.

The expansion portion for rear seat 111d, as illustrated in FIG. 1, is to protect the head Hr of the occupant Mr seated on the rear seat Sr, including a partition portion 111d1 (non-expansion portion) provided along the gas passage 111b, and two I-shaped partition portions 111d2 and 111d3 provided in the center connected with the partition portion 111d1 at upper ends thereof, which compart the central interior portion thereof into three expansion chambers (cells), 111d4, 111d5, and 111d6 which communicate with one another at lower ends where the expansion chamber 111d4 provided at a front end of the expansion portion communicates with the gas passage 111b at the upper end thereof.

Also in the second embodiment illustrated in FIG. 6, being constructed as mentioned above, the airbag (airbag 111) conformable to the vehicle model is selected from three types of airbags, and the tension cloth (tension cloth 12) conformable to the vehicle model is selected from the three types of tension clothes. And the thus sleeted airbag 111 and tension cloth 12 are combined with a single type of inflator 14 to construct the airbag module 10. Accordingly, an effect similar to that of the first embodiment illustrated in FIGS. 1 through 5 can expectedly be achieved.

According to a small number of types classified among all passenger vehicle models on the basis of a distance between front and rear seats Sf, Sr, supply parts for an airbag module 10, 110 including an airbag 11, 111, a tension cloth 12 and an inflator 14 include a small number of types of the airbags 11, 111 including an expansion portion for front seat 11c, 111c which covers protection ranges for the front seats Sf of a plurality of vehicle models included in the respective types and an expansion portion for rear seat 11d, 111d which covers protection ranges for the rear seats Sr of a plurality of vehicle models included in the respective types, a small number of types of tension clothes 12 a shape of which is determined to cover a plurality of vehicle models to be equipped with the respective airbags 11, 111, and a single type of inflator 14 connected with a gas inlet 11a, 111a provided in the respective airbags 11, 111. Consequently, the airbag module 10, 110, can be applied to all passenger vehicle models within a fleet of vehicles and the cost can be lowered thereby.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An adaptation method for adapting a window air bag device protecting the head of passengers sitting in a front seat and a rear seat of a vehicle to a plurality of vehicle models of a vehicle fleet, comprising the steps of:
   determining, for all vehicle models of the vehicle fleet, a size for each of a limited number of inflatable air bags having a front expansion portion for protecting the head of a front seat passenger, a rear expansion portion for protecting the head of a rear seat passenger and a gas passage connecting a gas chamber of the front expansion portion with a gas chamber of the rear expansion portion;
   determining a configuration for each of a limited number of substantially triangular tension cloths on the basis of a longitudinal length between the determined inflatable air bags and A pillars of groupings of vehicle models of the vehicle fleet to be provided with inflatable air bags;
   adapting an air bag module by combining an air bag conformable to a selected vehicle model based on the distance between the front and rear seats of the selected vehicle model of the vehicle fleet, selected from the limited number of determined inflatable air bags having at least different longitudinal lengths and one tension cloth conformable to the vehicle model, selected from the limited number of determined tension cloths having different dimensions which are determined based on distances between the inflatable air bags and a pillar of respective vehicle models adapted to be equipped with the air bags by stitching the tension cloth onto the air bag, and
   adding an inflator, having a single configuration, connected with a gas inlet of the selected inflatable air bag to the selected vehicle model, wherein the inflator is added in substantially a middle, top portion of the air bag and provides gas to a gas passage extending along a top side of the air bag, wherein
      the limited number of air bags is in the range between about 3 and about 6; and
      the limited number of tension cloths is in the range between about 3 and about 6.

2. The adaptation method for adapting a window air bag according to claim 1, wherein the step of determining the size for each of the limited number of inflatable air bags includes making the vertical dimensions of each of the limited number of inflatable air bags substantially the same.

3. An adaptation method for adapting a window air bag device protecting the head of passengers sitting in a front seat and a rear seat of a vehicle to a plurality of vehicle models of a vehicle fleet comprising the steps of:
   determining, for all vehicle models of the vehicle fleet, a size for each of a limited number of inflatable air bags having a front expansion portion for protecting the head of a front seat passenger, a rear expansion portion for protecting the head of a rear seat passenger and a gas passage connecting a gas chamber of the front expansion portion with a gas chamber of the rear expansion portion;
   determining a configuration for each of a limited number of substantially triangular tension cloths on the basis of a longitudinal length between the determined inflatable air bags and A pillars of groupings of vehicle models of the vehicle fleet to be provided with inflatable air bags;
   adapting an air bag module by combining an air bag conformable to a selected vehicle model based on the distance between the front and rear seats of the selected vehicle model of the vehicle fleet, selected from the limited number of determined inflatable air bags having at least different longitudinal lengths and one tension cloth conformable to the vehicle model, selected from the limited number of determined tension cloths having different dimensions which are determined based on distances between the inflatable air bags and a pillar of respective vehicle models adapted to be equipped with the air bags by stitching the tension cloth onto the air bag, and
   adding an inflator, having a single configuration, connected with a gas inlet of the selected inflatable air bag to the selected vehicle model, wherein the inflator is added in substantially a middle, top portion of the air bag and provides gas to a gas passage extending along a top side of the air bag, wherein
      the limited number of air bags is at least 2; and
      the limited number of tension cloths is at least 2.

4. The adaptation method for adapting a window air bag according to claim 3, wherein
   the limited number of air bags is in the range between about 3 and about 6; and
   the limited number of tension cloths is in the range between about 3 and about 6.

* * * * *